United States Patent
Fleute-Schlachter et al.

(10) Patent No.: US 10,757,935 B2
(45) Date of Patent: Sep. 1, 2020

(54) COMPOSITION COMPRISING A PESTICIDE AND AN ALKOXYLATED ESTER

(71) Applicant: BASF SE, Ludwigshafen am Rein (DE)

(72) Inventors: Ingo Fleute-Schlachter, Essen (DE); Hans-Christian Raths, Monheim (DE); Birgit Hupka, Duesseldorf (DE); Bjoern Thomas Hahn, Duesseldorf (DE); Juergen Roeder, Lotte (DE)

(73) Assignee: BASF SE, Ludwigshafen am Rhein (DE)

( * ) Notice: Subject to any disclaimer, the term of this patent is extended or adjusted under 35 U.S.C. 154(b) by 5 days.

(21) Appl. No.: 15/549,204

(22) PCT Filed: Feb. 3, 2016

(86) PCT No.: PCT/EP2016/052268
§ 371 (c)(1),
(2) Date: Aug. 7, 2017

(87) PCT Pub. No.: WO2016/128273
PCT Pub. Date: Aug. 18, 2016

(65) Prior Publication Data
US 2018/0027810 A1  Feb. 1, 2018

(30) Foreign Application Priority Data
Feb. 10, 2015  (EP) .................................. 15154431

(51) Int. Cl.
*A01N 37/02* (2006.01)
*A01N 37/08* (2006.01)
*A01N 43/54* (2006.01)
*A01N 43/653* (2006.01)

(52) U.S. Cl.
CPC ............. *A01N 37/02* (2013.01); *A01N 37/08* (2013.01); *A01N 43/54* (2013.01); *A01N 43/653* (2013.01)

(58) Field of Classification Search
None
See application file for complete search history.

(56) References Cited

U.S. PATENT DOCUMENTS

| | | | |
|---|---|---|---|
| 4,105,793 A | 8/1978 | Gross | |
| 5,013,659 A | 5/1991 | Bedbrook et al. | |
| 5,559,024 A | 9/1996 | Leroux et al. | |
| 6,222,100 B1 | 4/2001 | Anderson et al. | |
| 10,196,537 B2 * | 2/2019 | Sandoval | C09D 5/00 |

FOREIGN PATENT DOCUMENTS

| | | | |
|---|---|---|---|
| CN | 101461359 A | 6/2009 | |
| CN | 103340197 A | 10/2013 | |
| EP | 0242236 A1 | 10/1987 | |
| EP | 0242246 A1 | 10/1987 | |
| EP | 0257993 A2 | 3/1988 | |
| JP | 59230081 | * 11/1984 | |
| JP | 60112701 | * 6/1985 | |
| JP | 11035737 | * 2/1999 | |
| JP | 11116752 | * 4/1999 | |
| JP | 2000095606 A | 4/2000 | |
| JP | 2003238307 A | * 8/2003 | |
| JP | 2008247767 A | 10/2008 | |
| WO | 9013533 A1 | 11/1990 | |
| WO | 9200377 A1 | 1/1992 | |
| WO | 9741218 A1 | 11/1997 | |
| WO | 9802526 A1 | 1/1998 | |
| WO | 9802527 A1 | 1/1998 | |
| WO | 0026390 A2 | 5/2000 | |
| WO | 0035278 A1 | 6/2000 | |
| WO | 0042847 A1 | 7/2000 | |
| WO | 0182685 A1 | 11/2001 | |
| WO | 03013225 A2 | 2/2003 | |
| WO | 03014356 A1 | 2/2003 | |
| WO | 03014357 A1 | 2/2003 | |
| WO | 03022048 A1 | 3/2003 | |
| WO | 03090531 A1 | 11/2003 | |
| WO | 2004016073 A2 | 2/2004 | |
| WO | 2004106529 A2 | 12/2004 | |
| WO | 2005015998 A1 | 2/2005 | |
| WO | 2005020673 A1 | 3/2005 | |
| WO | 2005084435 A2 | 9/2005 | |
| WO | 2008132150 A1 | 11/2008 | |
| WO | 2009130281 A1 | 10/2009 | |
| WO | 2012061092 A1 | 5/2012 | |
| WO | 2014/080190 A1 | 5/2014 | |
| WO | WO2014149756 | * 9/2014 | |
| WO | WO-2014149756 A1 * | 9/2014 | ............... C08K 5/10 |

OTHER PUBLICATIONS

Extended European Search Report for EP Application No. 15154431.9, dated Sep. 28, 2015. 12 pages.
Mouloungui, et al., "Synthesis and Influence of Fatty Acid Esters on the Foliar Penetration of Herbicides", Industrial Crops and Products, vol. 8, Issue 1, Mar. 1998, pp. 1-1.
Nobuyasu, et al., "Animal Repellents Containing Biodegradable Resins", Chemical Abstracts Service, Columbus, Ohio, US, Database CA [Online], XP002739062, retrieved from STN Da, 2008, 2 pages.
Partial European Search Report for EP Patent Application No. 15154431.9, dated May 13, 2015, 7 pages.
Partial Search Report and Written Opinion for PCT Patent Application No. PCT/EP2016/052268, dated Apr. 29, 2016, 7 pages.

(Continued)

*Primary Examiner* — Alton N Pryor
(74) *Attorney, Agent, or Firm* — Armstrong Teasdale LLP

(57) ABSTRACT

A composition comprising a pesticide and alkoxylated ester is provided, as well as seed including the composition. Use of alkoxylated esters as adjuvants in pesticide-comprising spray mixtures are also described. Methods for controlling phytopathogenic fungi and/or undesirable plant growth and/or undesirable insect or mite infestation and/or for regulating the growth of plants are further provided, wherein the composition is allowed to act on the respective pests, the habitat thereof or the plants to be protected from the respective pest, on the soil and/or on undesirable plants and/or the crop plants and/or the habitat thereof.

12 Claims, No Drawings

(56) References Cited

OTHER PUBLICATIONS

Shinichi, et al., "Biodegradable Surfactant Compositions for Agrochemical Preparations Containing Nonionic Ester Surfactants and Sulfosuccinates", Chemical Abstracts Service, 2000, 4 pages.
Shuwen, et al., "Preparation of Slow/Controlled-Release Miorooapsule Pesticide", Chemical Abstracts Service, Columbus, Ohio, US, Database CA [Online], XP002743705, retrieved, 2013, 2 pages.
Yongsong, et al., "Method for Producing Controlled-Release Nanosoaie Pesticide", Chemical Abstracts Service, Columbus, Ohio, US, Database CA [Online], XP002743706, Database ac 2009, 2 pages.
International Search Report and Written Opinion for International Application No. PCT/EP2016/052268, dated Jul. 11, 2016, 15 pages.

* cited by examiner

COMPOSITION COMPRISING A PESTICIDE AND AN ALKOXYLATED ESTER

CROSS-REFERENCE TO RELATED APPLICATIONS

This application is a U.S. National Phase Application of PCT/EP2016/052268, filed Feb. 3, 2016, which claims the benefit of priority to European Patent Application No. 15154431.9, filed Feb. 10, 2015, the entire contents of which are hereby incorporated by reference herein.

BACKGROUND

The present invention relates to a composition comprising a pesticide and an alkoxylated ester. The invention further relates to use of an alkoxylated ester as adjuvants in pesticide-comprising spray mixtures. The invention further relates to a method for controlling phytopathogenic fungi and/or undesirable plant growth and/or undesirable insect or mite infestation and/or for regulating the growth of plants, wherein the composition is allowed to act on the respective pests, the habitat thereof or the plants to be protected from the respective pest, on the soil and/or on undesirable plants and/or the crop plants and/or the habitat thereof. Furthermore, the invention relates to seed comprising the composition.

DESCRIPTION

The present invention comprises combinations of preferred features with other preferred features.

It is generally known and agricultural practice to add certain adjuvants to formulations in order to improve the activity of the latter. Advantageously, this allows reduced amounts of active ingredient in the formulation while maintaining the same activity, thereby being able to minimize cost and, if appropriate, operating within existing legislation. In individual cases, this also allows the spectrum of the active ingredient to be widened, since plants whose treatment with a specific active ingredient without addition was only possible to an unsatisfactory extent, are now capable of being subjected to such a treatment as the result of the addition of certain auxiliaries.

Furthermore, the performance under adverse environmental conditions may be increased in individual cases by a suitable formulation. Of course, incompatibilities of various active ingredients in one formulation can also be avoided. Such auxiliaries are sometimes also referred to as adjuvants. Frequently, they take the form of surface-active or salt-like compounds.

As regards the uptake of the active ingredient into the leaf, surface-active substances may act as modifiers and adjuvants. In general, it is assumed that suitable surface-active substances are capable of increasing the effective contact area of fluids on leaves by providing better wetting. Moreover, certain surface-active substances act as plasticizer, i.e. are capable of changing the epicuticular waxy layer from a crystalline to an amorphous state, which facilitates the sorption of the active ingredient. Furthermore, some surface-active substances are also capable of improving the solubility of active ingredients in formulations, thereby avoiding, or at least delaying, crystal formation. Finally, in certain cases they can also influence the absorption of active ingredients by retaining moisture.

Synthetic surface-active substances which have usually been used as adjuvants drawing upon, inter alia, polyoxyethylene condensates with alcohols, alkylphenols or alkylamines with HLB values in the range of from 8 to 13. In this regard, the document WO 00/42847 mentions for example the use of certain linear alcohol alkoxylates in order to increase the activity of agrochemical biocide formulations.

It is in particular the structure of the alcohol moiety and in certain cases also of the alkoxylate moiety and its terminal group which influences the properties of the surfactants leading to a variety of technical effects showing usefulness in these applications. These include wetting, spreading, penetration, adhesion, film formation, the improvement of compatibilities, drift control, and defoaming.

WO 03/090531 describes the use of alkoxylates of certain branched alcohols as adjuvant for the agrochemical sector. Similar alcohol alkoxylates are proposed in WO 2005/015998 specifically as adjuvant for fungicidal benzamide oxime derivatives. WO 00/35278 relates to agrochemical formulations based on PO/EO block copolymers of 2-ethylhexanol. WO 2005/084435 describes oil based suspension concentrates which comprise one of the two end group-capped alcohol block alkoxylates as penetrant. Also WO 08/132150 and WO 09/130281 described certain alcohol alkoxylates having adjuvant activity. WO 03/022048 describes inter alia as adjuvant $C_1$-$C_7$ alkyl capped oleyl alcohol ethoxylates whereby the production of such compounds is rather critical due to the use of alkyl chloride.

The present invention is based on the object of providing further adjuvants which are useful in the agrochemical sector.

The object was solved by a composition comprising a pesticide and an alkoxylated ester of the general formula (I)

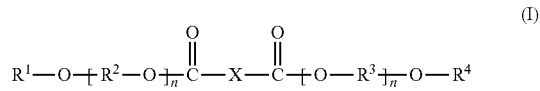

(I)

and/or an alkoxylated ester of the general formula (II)

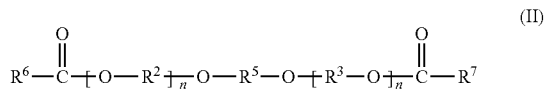

(II)

where $R^1$, $R^4$, $R^6$ and $R^7$ each independently are a linear or branched alkyl having 5 to 18 carbon atoms, a linear or branched alkenyl having 5 to 18 carbon atoms, a heteroalkyl having 3 to 18 carbon atoms or a heteroalkenyl having 3 to 18 carbon atoms;

$R^2$ and $R^3$ each independently are ethylene, propylene, butylene or a mixture thereof;

X is a single bond, a saturated or unsaturated, linear or branched alkylene having 1 to 14 carbon atoms, a cycloalkylene having 4 to 14 carbon atoms, a saturated or unsaturated, linear or branched heteroalkylene having 1 to 14 carbon atoms or a heterocycloalkylene having 4 to 14 carbon atoms;

$R^5$ is a saturated or unsaturated, linear or branched alkylene having 1 to 14 carbon atoms, a cycloalkylene having 4 to 14 carbon atoms, a saturated or unsaturated, linear or branched heteroalkylene having 1 to 14 carbon atoms or a heterocycloalkylene having 4 to 14 carbon atoms; and n has a value of from 1 to 100.

$R^1$ and $R^4$ each independently are a linear or branched alkyl having 5 to 18 carbon atoms, a linear or branched alkenyl having 5 to 18 carbon atoms, a linear or branched heteroalkyl having 3 to 18 carbon atoms or a linear or branched heteroalkenyl having 3 to 18 carbon atoms. Preferably, $R^1$ and $R^4$ each independently are a linear or branched alkyl, alkenyl, heteroalkyl or heteroalkenyl having 8 to 14 carbon atoms, especially preferably a branched alkyl or heteroalkyl having 8 to 14 carbon atoms. In a specifically preferred embodiment, $R^1$ and $R^4$ each independently are a linear or branched alkyl or heteroalkyl having 8 to 12 carbon atoms. In a further specifically preferred embodiment, $R^1$ and $R^4$ each independently are a linear or branched alkyl or heteroalkyl having 8 to 10 carbon atoms.

In a preferred embodiment, $R^1$ and $R^4$ are identical and have an alkyl or heteroalkyl as defined above. Preferably, $R^1$ and $R^4$ are a branched alkyl having 9 carbon atoms, even more preferably are isononyl, 2-ethylhexyl or 2-propylheptyl.

$R^2$ and $R^3$ each independently are preferably ethylene, propylene or butylene or a mixture thereof. In this context, for example $R^2$ and $R^3$ may comprise a mixture of these groups. Such mixtures can be linked to one another in any desired order, for example randomly or blockwise (such as one block ethylene and one block propylene). In a preferred embodiment, $R^2$ and $R^3$ are independently of one another ethylene or a mixture of ethylene and propylene.

In another preferred embodiment, $R^2$ and $R^3$ are ethylene.

If $R^2$ and/or $R^3$ comprise a butylene radical, the latter may be present as a n-butylene, an isobutylene or a 2,3-butylene group, with n-butylene and isobutylene being preferred and n-butylene being most preferred.

$R^6$ and $R^7$ each independently are a linear or branched alkyl having 5 to 18 carbon atoms, a linear or branched alkenyl having 5 to 18 carbon atoms, a linear or branched heteroalkyl having 3 to 18 carbon atoms or a linear or branched heteroalkenyl having 3 to 18 carbon atoms. Preferably, $R^6$ and $R^7$ each independently are a linear or branched alkyl, alkenyl, heteroalkyl or heteroalkenyl having 8 to 14 carbon atoms, especially preferably a branched alkyl or heteroalkyl having 8 to 14 carbon atoms. In a specifically preferred embodiment, $R^6$ and $R^7$ each independently are a linear or branched alkyl or heteroalkyl having 8 to 12 carbon atoms. In a further specifically preferred embodiment, $R^6$ and $R^7$ each independently are a linear or branched alkyl or heteroalkyl having 8 to 10 carbon atoms.

In a preferred embodiment, $R^6$ and $R^7$ are identical and have an alkyl or heteroalkyl as defined above. Preferably, $R^6$ and $R^7$ are a branched alkyl having 9 carbon atoms, even more preferably isononyl, 2-ethylhexyl or 2-propylheptyl.

X is a single bond, a saturated or unsaturated, linear or branched alkylene having 1 to 14 carbon atoms, a cycloalkylene having 4 to 14 carbon atoms, a saturated or unsaturated, linear or branched heteroalkylene having 1 to 14 carbon atoms or a heterocycloalkylene having 4 to 14 carbon atoms. Preferably, X is a saturated or unsaturated, linear or branched alkylene having 3 to 10 carbon atoms, a cycloalkylene having 3 to 10 carbon atoms, a saturated or unsaturated, linear or branched heteroalkylene having 3 to 10 carbon atoms or a heterocycloalkylene having 3 to 10 carbon atoms. In a preferred embodiment, X is a saturated, linear alkylene having 4 carbon atoms, a cycloalkylene having 6 carbon atoms, a heterocyclolalkylene having 4 carbon atoms and 1 oxygen atom, a heterocyclolalkylene having 4 carbon atoms and 2 nitrogen atoms or furanyl. More preferably, X is a saturated, linear alkylene having 4 carbon atoms, 1,2-cyclohexylene, 1,3-cyclohexylene or 1,4-cyclohexylene.

$R^5$ is a saturated or unsaturated, linear or branched alkylene having 1 to 14 carbon atoms, a cycloalkylene having 4 to 14 carbon atoms, a saturated or unsaturated, linear or branched heteroalkylene having 1 to 14 carbon atoms or a heterocycloalkylene having 4 to 14 carbon atoms.

Preferably, $R^5$ is a saturated or unsaturated, linear or branched alkylene having 3 to 10 carbon atoms, a cycloalkylene having 3 to 10 carbon atoms, a saturated or unsaturated, linear or branched heteroalkylene having 3 to 10 carbon atoms or a heterocycloalkylene having 3 to 10 carbon atoms. In a preferred embodiment, $R^5$ is a saturated, linear alkylene having 4 carbon atoms, a cycloalkylene having 6 carbon atoms, a heterocyclolalkylene having 4 carbon atoms and 1 oxygen atom, a heterocyclolalkylene having 4 carbon atoms and 2 nitrogen atoms or furanyl. More preferably, $R^5$ is a 1,2-cyclohexylene, 1,3-cyclohexylene or 1,4-cyclohexylene.

In a preferred embodiment, the alkoxylated esters of the present invention are selected from the group consisting of di-isononanyl-3EO-adipate, 1,2-Cyclohexanediol-6EO-diisononate and cyclohexanedicarboxylic acid-isononanol-3EO-diester.

The term "alkyl" in the context of the present invention refers to acyclic hydrocarbon residues. Examples for linear or branched alkyl having 5 to 18 carbon atoms are methyl, ethyl, n-propyl, isopropyl, n-butyl, isobutyl, 2-butyl, tert-butyl, n-pentyl, 2-pentyl, 3-pentyl, iso-pentyl, neo-pentyl, n-hexyl, 2-hexyl, 3-hexyl, n-heptyl, n-octyl, —C(H)($C_2H_5$)$_2$, —C(H)(n-$C_3H_7$)$_2$ and —$CH_2$—$CH_2$—C(H)($CH_3$)—($CH_2$)$_3$—$CH_3$ etc.

The term "alkenyl" in the context of the present invention refers to acyclic unsaturated hydrocarbon residues and have at least one double bond, preferably 1, 2 or 3 double bonds. Examples for linear or branched alkenyl having 5 to 18 carbon atoms are ethenyl, 1-propenyl, 2-propenyl, 1-butenyl, 2-butenyl, 3-butenyl, 1-pentenyl, 2-pentenyl, 3-pentenyl, 4-pentenyl, hexenyl, —CH=C($CH_3$)$_2$, —CH=CH—CH=CH—$CH_3$, and —$CH_2$—$CH_2$—CH=$CH_2$ etc.

The term "heteroalkyl" in the context of the present invention refers to an alkyl residue as described above, in which one or more C atoms have been respectively replaced by a heteroatom independently selected from the group consisting of oxygen, sulfur and nitrogen (NH). Heteroalkyl residues can preferably have 1, 2 or 3 heteroatom(s) independently selected from the group consisting of oxygen, sulfur and nitrogen (NH) as chain member(s). Examples are —$CH_2$—O—$CH_3$, —$CH_2$—S—$CH_3$, —$CH_2$—NH—$CH_3$, etc.

The term "heteroalkenyl" in the context of the present invention refers to an alkenyl residue as described above, in which one or more C atoms have been respectively replaced by a heteroatom independently selected from the group consisting of oxygen, sulfur and nitrogen (NH). Heteroalkenyl residues preferably may contain 1, 2 or 3 heteroatom(s) independently selected from the group consisting of oxygen, sulfur and nitrogen (NH) as chain member(s). Examples are —$CH_2$—O—CH=$CH_2$, —$CH_2$—S—CH=$CH_2$, —$CH_2$—NH—CH=$CH_2$, etc.

A "single bond" in the context of the present invention means that the —CO—X—CO— group in formula (I) is —CO—CO—, i.e. the carbon atoms are directly bonded.

The term "saturated" in the context of the present invention means that the carbon atoms are linked by single bonds.

The term "unsaturated" in the context of the present invention means that the carbon atoms are linked by at least one double bond.

"Alkylene" in the context of the present invention means a hydrocarbon chain radical which forms a bond with adjacent carbon atoms as in Formulas (I) and (II). Examples for linear alkylene having 1 to 14 carbon atoms are —CH$_2$—, —(CH$_2$)$_2$—, —(CH$_2$)$_3$—, —(CH$_2$)$_4$-(butylene), —(CH$_2$)$_5$—, —(CH$_2$)$_6$—, —(CH$_2$)$_7$—, —(CH$_2$)$_8$—, —(CH$_2$)$_9$—, —(CH$_2$)$_{10}$—, —(CH$_2$)$_{11}$—, —(CH$_2$)$_{12}$—, —(CH$_2$)$_{13}$— and —(CH$_2$)$_{14}$—, i.e. methylene, ethylene, propylene, butylene etc.

The term "heteroalkylene" in the context of the present invention refers to an alkylene residue as described above, in which one or more C atoms have been respectively replaced by a heteroatom independently selected from the group consisting of oxygen, sulfur and nitrogen (NH). Heteroalkenyl residues preferably may contain 1, 2 or 3 heteroatom(s) independently selected from the group consisting of oxygen, sulfur and nitrogen (NH) as chain member(s).

"Cycloalkylene" in the context of the present invention means a hydrocarbon ring radical which forms a bond with adjacent carbon atoms as in Formulas (I) and (II). A cycloalkylene also refers to a hydrocarbon ring radical comprising at least one double bond wherein the ring forms a bond with adjacent carbon atoms as in Formulas (I) and (II). Examples for cycloalkylene having 4 to 14 carbon atoms are cyclobutylene, cyclopentylene, cyclohexylene etc.

The term "heterocycloalkylene" in the context of the present invention refers to a cycloalkylene residue as described above, in which one or more C atoms have been respectively replaced by a heteroatom independently selected from the group consisting of oxygen, sulfur and nitrogen (NH) and wherein the hydrocarbon ring radical can optionally comprise at least one double bond. Heteroalkenyl residues preferably may contain 1, 2 or 3 heteroatom(s) independently selected from the group consisting of oxygen, sulfur and nitrogen (NH) as chain member(s).

In a most preferred embodiment, the alkoxylated esters in accordance with the present invention are selected from the group consisting of Di-isononanyl-[(CH$_2$)$_2$—O]$_n$-adipate, Cyclohexanedicarboxylic acid-isononanol-[(CH$_2$)$_2$—O]$_n$-diester and 1,2-Cyclohexanediol-[(CH$_2$)$_2$—O]$_n$-di-isononate.

Preferably, n has a value of from 1 to 100, preferably 3 to 50, especially preferably from 1 to 10 or 3 to 10. The value of n is normally an average value as it mostly depends upon the alkoxylation with oxirane derivatives. Therefore, n can not only be an integer, but also all values between the integers.

In most cases, the composition according to the invention comprises from 0.1 to 50% by weight of the alkoxylated ester as defined above, preferably from 1 to 25% by weight and in particular from 3 to 15% by weight.

The term pesticide refers to at least one active substance selected from the group of the fungicides, insecticides, nematicides, herbicides, safeners, molluscicides, rodenticides and/or growth regulators. Preferred pesticides are fungicides, insecticides, herbicides and growth regulators. Especially preferred pesticides are fungicides. Mixtures of pesticides from two or more of the abovementioned classes may also be used. The skilled person is familiar with such pesticides, which can be found, for example, in Pesticide Manual, 16th Ed. (2013), The British Crop Protection Council, London. The above disclosed pesticides can be combined with any alkoxylated ester of the present invention. Suitable insecticides are insecticides from the class of the carbamates, organophosphates, organochlorine insecticides, phenylpyrazoles, pyrethroids, neonicotinoids, spinosins, avermectins, milbemycins, juvenile hormone analogs, alkyl halides, organotin compounds nereistoxin analogs, benzoylureas, diacylhydrazines, METI acarizides, and insecticides such as chloropicrin, pymetrozin, flonicamid, clofentezin, hexythiazox, etoxazole, diafenthiuron, propargite, tetradifon, chlorofenapyr, DNOC, buprofezine, cyromazine, amitraz, hydramethylnon, acequinocyl, fluacrypyrim, rotenone, or their derivatives. Suitable fungicides are fungicides from the classes of dinitroanilines, allylamines, anilinopyrimidines, antibiotics, aromatic hydrocarbons, benzenesulfonamides, benzimidazoles, benzisothiazoles, benzophenones, benzothiadiazoles, benzotriazines, benzyl carbamates, carbamates, carboxamides, carboxylic acid diamides, chloronitriles cyanoacetamide oximes, cyanoimidazoles, cyclopropanecarboxamides, dicarboximides, dihydrodioxazines, dinitrophenyl crotonates, dithiocarbamates, dithiolanes, ethylphosphonates, ethylaminothiazolecarboxamides, guanidines, hydroxy-(2-amino)pyrimidines, hydroxyanilides, imidazoles, imidazolinones, inorganic substances, isobenzofuranones, methoxyacrylates, methoxycarbamates, morpholines, N phenylcarbamates, oxazolidinediones, oximinoacetates, oximinoacetamides, peptidylpyrimidine nucleosides, phenylacetamides, phenylamides, phenylpyrroles, phenylureas, phosphonates, phosphorothiolates, phthalamic acids, phthalimides, piperazines, piperidines, propionamides, pyridazinones, pyridines, pyridinylmethylbenzamides, pyrimidinamines, pyrimidines, pyrimidinonehydrazones, pyrroloquinolinones, quinazolinones, quinolines, quinones, sulfamides, sulfamoyltriazoles, thiazolecarboxamides, thiocarbamates, thiophanates, thiophenecarboxamides, toluamides, triphenyltin compounds, triazines, triazoles. Suitable herbicides are herbicides from the classes of the acetamides, amides, aryloxyphenoxypropionates, benzamides, benzofuran, benzoic acids, benzothiadiazinones, bipyridylium, carbamates, chloroacetamides, chlorocarboxylic acids, cyclohexanediones, dinitroanilines, dinitrophenol, diphenyl ether, glycines, imidazolinones, isoxazoles, isoxazolidinones, nitriles, N-phenylphthalimides, oxadiazoles, oxazolidinediones, oxyacetamides, phenoxycarboxylic acids, phenylcarbamates, phenylpyrazoles, phenylpyrazolines, phenylpyridazines, phosphinic acids, phosphoroamidates, phosphorodithioates, phthalamates, pyrazoles, pyridazinones, pyridines, pyridinecarboxylic acids, pyridinecarboxamides, pyrimidinediones, pyrimidinyl(thio)benzoates, quinolinecarboxylic acids, semicarbazones, sulfonylaminocarbonyltriazolinones, sulfonylureas, tetrazolinones, thiadiazoles, thiocarbamates, triazines, triazinones, triazoles, triazolinones, triazolocarboxamides, triazolopyrimidines, triketones, uracils, ureas.

The pesticide has preferably a solubility in water of less than 10 g/l at 20° C., more preferably of less than 1, g/l, even more preferably of less than 0.5 g/l and most preferably of less than 0.1 g/l.

Preferred pesticides of the compositions of the present invention comprise at least one fungicide selected from carboxamides, azoles, strobilurins, phenylamides, phenylpyrrole, morpholines, spiro ketalamines and dithiocarbamates. Particularly preferred are fungicides selected from pyrazole-4-carboxamides, pyridinyl-ethyl benzamides, phenyl benzamides, triazoles and strobilurins. In a more preferred embodiment, the fungicides are selected from boscalid, epoxiconazole, azoxystrobin and dimoxystrobin.

The pesticide of the compositions of the present invention may also comprise at least one fungicide and a further pesticide (such as at least one herbicide, insecticide, and/or safener, with herbicides being preferred).

The compositions according to the invention can furthermore be converted into customary types of agrochemical compositions, e. g. solutions, emulsions, suspensions, dusts, powders, pastes, granules, pressings, capsules, and mixtures thereof. Examples for composition types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further compositions types are defined in the "Catalogue of pesticide formulation types and international coding system", Technical Monograph No. 2, $6^{th}$ Ed. May 2008, CropLife International.

The compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Examples for suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides, dimethyllactamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharide powders, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a negligible or even no pesticidal activity themselves, and which improve the biological performance of the active on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for composition types and their preparation are:
i) Water-Soluble Concentrates (SL, LS)
10-60 wt % of a pesticide and 5-15 wt % wetting agent (e.g. alcohol alkoxylates) are dissolved in water and/or in a water-soluble solvent (e.g. alcohols) up to 100 wt %. The active substance dissolves upon dilution with water.
ii) Dispersible Concentrates (DC)
5-25 wt % of a pesticide and 1-10 wt % dispersant (e. g. polyvinylpyrrolidone) are dissolved in up to 100 wt % organic solvent (e.g. cyclohexanone). Dilution with water gives a dispersion.
iii) Emulsifiable Concentrates (EC)
15-70 wt % of a pesticide and 5-10 wt % emulsifiers (e.g. calcium dodecylbenzenesulfonate and castor oil ethoxylate)

are dissolved in up to 100 wt % water-insoluble organic solvent (e.g. aromatic hydrocarbon). Dilution with water gives an emulsion.

iv) Emulsions (EW, EO, ES)

5-40 wt % of a pesticide and 1-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into up to 100 wt % water by means of an emulsifying machine and made into a homogeneous emulsion. Dilution with water gives an emulsion.

v) Suspensions (SC, OD, FS)

In an agitated ball mill, 20-60 wt % of a pesticide are comminuted with addition of 2-10 wt % dispersants and wetting agents (e.g. sodium lignosulfonate and alcohol ethoxylate), 0.1-2 wt % thickener (e.g. xanthan gum) and up to 100 wt % water to give a fine active substance suspension. Dilution with water gives a stable suspension of the active substance. For FS type composition up to 40 wt % binder (e.g. polyvinylalcohol) is added.

vi) Water-Dispersible Granules and Water-Soluble Granules (WG, SG)

50-80 wt % of a pesticide are ground finely with addition of up to 100 wt % dispersants and wetting agents (e.g. sodium lignosulfonate and alcohol ethoxylate) and prepared as water-dispersible or water-soluble granules by means of technical appliances (e. g. extrusion, spray tower, fluidized bed). Dilution with water gives a stable dispersion or solution of the active substance.

vii) Water-Dispersible Powders and Water-Soluble Powders (WP, SP, WS)

50-80 wt % of a pesticide are ground in a rotor-stator mill with addition of 1-5 wt % dispersants (e.g. sodium lignosulfonate), 1-3 wt % wetting agents (e.g. alcohol ethoxylate) and up to 100 wt % solid carrier, e.g. silica gel. Dilution with water gives a stable dispersion or solution of the active substance.

viii) Gel (GW, GF)

In an agitated ball mill, 5-25 wt % of a pesticide are comminuted with addition of 3-10 wt % dispersants (e.g. sodium lignosulfonate), 1-5 wt % thickener (e.g. carboxymethylcellulose) and up to 100 wt % water to give a fine suspension of the active substance. Dilution with water gives a stable suspension of the active substance.

iv) Microemulsion (ME)

5-20 wt % of a pesticide are added to 5-30 wt % organic solvent blend (e.g. fatty acid dimethylamide and cyclohexanone), 10-25 wt % surfactant blend (e.g. alcohol ethoxylate and arylphenol ethoxylate), and water up to 100%. This mixture is stirred for 1 h to produce spontaneously a thermodynamically stable microemulsion.

iv) Microcapsules (CS)

An oil phase comprising 5-50 wt % of a pesticide, 0-40 wt % water insoluble organic solvent (e.g. aromatic hydrocarbon), 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of a pesticide, 0-40 wt % water insoluble organic solvent (e.g. aromatic hydrocarbon), and an isocyanate monomer (e.g. diphenylmethene-4,4'-diisocyanatae) are dispersed into an aqueous solution of a protective colloid (e.g. polyvinyl alcohol). The addition of a polyamine (e.g. hexamethylenediamine) results in the formation of a polyurea microcapsules. The monomers amount to 1-10 wt %. The wt % relate to the total CS composition.

ix) Dustable Powders (DP, DS)

1-10 wt % of a pesticide are ground finely and mixed intimately with up to 100 wt % solid carrier, e.g. finely divided kaolin.

x) Granules (GR, FG)

0.5-30 wt % of a pesticide is ground finely and associated with up to 100 wt % solid carrier (e.g. silicate). Granulation is achieved by extrusion, spray-drying or the fluidized bed.

xi) Ultra-Low Volume Liquids (UL)

1-50 wt % of a pesticide are dissolved in up to 100 wt % organic solvent, e.g. aromatic hydrocarbon.

The compositions types i) to xi) may optionally comprise further auxiliaries, such as 0.1-1 wt % bactericides, 5-15 wt % anti-freezing agents, 0.1-1 wt % anti-foaming agents, and 0.1-1 wt % colorants.

The agrochemical compositions generally comprise between 0.01 and 95%, preferably between 0.1 and 90%, and most preferably between 0.5 and 75%, by weight of pesticide. The active substances are employed in a purity of from 90% to 100%, preferably from 95% to 100% (according to NMR spectrum).

Water-soluble concentrates (LS), Suspoemulsions (SE), flowable concentrates (FS), powders for dry treatment (DS), water-dispersible powders for slurry treatment (WS), water-soluble powders (SS), emulsions (ES), emulsifiable concentrates (EC) and gels (GF) are usually employed for the purposes of treatment of plant propagation materials, particularly seeds. The compositions in question give, after two-to-tenfold dilution, active substance concentrations of from 0.01 to 60% by weight, preferably from 0.1 to 40% by weight, in the ready-to-use preparations. Application can be carried out before or during sowing. Methods for applying or treating pesticide and compositions thereof, respectively, on to plant propagation material, especially seeds include dressing, coating, pelleting, dusting, soaking and in-furrow application methods of the propagation material. Preferably, pesticide or the compositions thereof, respectively, are applied on to the plant propagation material by a method such that germination is not induced, e. g. by seed dressing, pelleting, coating and dusting.

When employed in plant protection, the amounts of active substances applied are, depending on the kind of effect desired, from 0.001 to 2 kg per ha, preferably from 0.005 to 2 kg per ha, more preferably from 0.05 to 0.9 kg per ha, in particular from 0.1 to 0.75 kg per ha.

In treatment of plant propagation materials such as seeds, e. g. by dusting, coating or drenching seed, amounts of active substance of from 0.1 to 1000 g, preferably from 1 to 1000 g, more preferably from 1 to 100 g and most preferably from 5 to 100 g, per 100 kilogram of plant propagation material (preferably seed) are generally required.

When used in the protection of materials or stored products, the amount of active substance applied depends on the kind of application area and on the desired effect. Amounts customarily applied in the protection of materials are 0.001 g to 2 kg, preferably 0.005 g to 1 kg, of active substance per cubic meter of treated material.

Various types of oils, wetters, adjuvants, fertilizer, or micronutrients, and other pesticides (e.g. herbicides, insecticides, fungicides, growth regulators, safeners) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

The user applies the composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

The composition according to the invention may comprise from 0.1 to 40% by weight, preferably from 1 to 30 and in particular from 2 to 20% by weight of surface-active substances (as disclosed above), the amount of the alkoxylated ester of the invention not being taken into consideration.

The present invention furthermore relates to a method for controlling phytopathogenic fungi and/or undesirable vegetation and/or undesirable insect or mite infestation and/or for regulating the growth of plants, wherein the composition according to the invention is allowed to act on the respective pests, their environment or on the crop plants to be protected from the respective pests, on the soil and/or on undesired plants and/or on the crop plants and/or their environment.

Examples of suitable crop plants are cereals, for example wheat, rye, barley, triticale, oats or rice; beet, for example sugar or fodder beet; pome fruit, stone fruit and soft fruit, for example apples, pears, plums, peaches, almonds, cherries, strawberries, raspberries, currants or gooseberries; legumes, for example beans, lentils, peas, lucerne or soybeans; oil crops, for example oilseed rape, mustard, olives, sunflowers, coconut, cacao, castor beans, oil palm, peanuts or soybeans; cucurbits, for example pumpkins/squash, cucumbers or melons; fiber crops, for example cotton, flax, hemp or jute; citrus fruit, for example oranges, lemons, grapefruit or tangerines; vegetable plants, for example spinach, lettuce, asparagus, cabbages, carrots, onions, tomatoes, potatoes, pumpkin/squash or capsicums; plants of the laurel family, for example avocados, cinnamon or camphor; energy crops and industrial feedstock crops, for example maize, soybeans, wheat, oilseed rape, sugar cane or oil palm; tobacco; nuts; coffee; tea; bananas; wine (dessert grapes and grapes for vinification); hops; grass, for example turf; sweetleaf (*Stevia rebaudania*); rubber plants and forest plants, for example flowers, shrubs, deciduous trees and coniferous trees, and propagation material, for example seeds, and harvested products of these plants.

The term crop plants also includes those plants which have been modified by breeding, mutagenesis or recombinant methods, including the biotechnological agricultural products which are on the market or in the process of being developed. Genetically modified plants are plants whose genetic material has been modified in a manner which does not occur under natural conditions by hybridizing, mutations or natural recombination (i.e. recombination of the genetic material). Here, one or more genes will, as a rule, be integrated into the genetic material of the plant in order to improve the plant's properties. Such recombinant modifications also comprise posttranslational modifications of proteins, oligo- or polypeptides, for example by means of glycosylation or binding of polymers such as, for example, prenylated, acetylated or farnesylated residues or PEG residues.

Examples which may be mentioned are plants which, as the result of plant-breeding and recombinant measures, have acquired a tolerance for certain classes of herbicides, such as hydroxyphenylpyruvate dioxygenase (HPPD) inhibitors, acetolactate synthase (ALS) inhibitors such as, for example, sulfonylureas (EP-A 257 993, U.S. Pat. No. 5,013,659) or imidazolinones (for example U.S. Pat. No. 6,222,100, WO 01/82685, WO 00/26390, WO 97/41218, WO 98/02526, WO 98/02527, WO 04/106529, WO 05/20673, WO 03/14357, WO 03/13225, WO 03/14356, WO 04/16073), enolpyruvylshikimate 3-phosphate synthase (EPSPS) inhibitors such as, for example, glyphosate (see, for example, WO 92/00377), glutamine synthetase (GS) inhibitors such as, for example, glufosinate (see, for example, EP-A 242 236, EP-A 242 246) or oxynil herbicides (see, for example, U.S. Pat. No. 5,559,024). For example, breeding and mutagenesis have given rise to Clearfield® oilseed rape (BASF SE, Germany), which features tolerance for imidazolinones, for example imazamox. With the aid of recombinant methods, crop plants such as soybeans, cotton, maize, beet and oilseed rape have been generated which are resistant to glyphosate or glufosinate, and these are available by the brand names RoundupReady® (glyphosate-resistant, Monsanto, U.S.A.) and Liberty Link® (glufosinate-resistant, Bayer CropScience, Germany).

The preparation of alkoxylated ester of the present invention is generally known. They are usually produced by reacting a carboxylic acid with an alkoxylated alcohol, an anhydride of the carboxylic acid or another activated form of the carboxylic acid with the alkoxylated alcohol or by transesterification from an existing ester. In general esterification reactions are equilibrium reactions and can accelerated by using catalysts like Brönsted or Lewis-acids or in case of transesterification also by using alkaline catalysts.

Alternatively non alkoxylated esters can be transferred to alkoxylated esters by direct alkoxylation, which is known especially for the manufacture of the ethoxylated esters, by using special catalysts.

The production processes are known per se and are also disclosed e.g. in Houben-Weyl: Methods of Organic Chemistry and WO 90/13533.

The present invention furthermore relates to a method of preparing the composition according to the invention by bringing the pesticide and the alkoxylated ester of the general formula (I) and/or (II) into contact, e.g. by mixing. The contacting may be done between 5 to 95° C. Thus, a tankmix or an agrochemical composition may be prepared.

The present invention also relates to the use of the alkoxylated ester of the present invention as disclosed above as adjuvants in pesticide-comprising spray mixtures. The adjuvant preferably enhances the efficacy of a pesticide. They enhance or accelerate the activity of pesticides in comparison with the activity of the pesticide in the absence of the adjuvant.

The present invention also relates to a method of improving the activity of one or more pesticides comprising the step of mixing an effective amount of alkoxylated ester of the present invention with one or more pesticides described in the present disclosure. An effective amount may be the amount that is necessary to enhance or accelerate the activity of pesticides in comparison with the activity of the pesticide in the absence of the adjuvant.

The advantages of the invention are the ability of the alkoxylated ester of the present invention to enhance the activity of pesticides; to enhance the yield.

The examples which follow illustrate the invention without imposing any limitation.

EXAMPLES

Example 1—Synthesis of Alkoxylated Ester

The following alkoxylated esters were obtained by the method described below:

Di-Isononanyl-3EO-Adipate 2.26 mol of Isononanol+3EO was esterified with 1.13 mol of adipic acid using 0.03% of Tin-oxalate (Tegokat® 160 obtainable by Goldschmidt Industrial Chemical Corp or Tibcat® 160 obtainable by TIB Chemicals) at 160-220° C. until the calculated amount of water (2.26 mol) was removed by applying vacuum down to 50 mbar or even less. The final ester was bleached and filtrated by using Tonsil® filter aid (obtainable by Sid-Chemie AG, Germany) at 95° C. and a Seitz pressure filter with a K800 filter sheet (obtainable by Seitz-Schenk Fildersystems GmbH, Germany).

1,2-Cyclohexanediol-6EO-Di-Isononate 1,2-Cyclohexanediol-6EO-di-isononate was produced in the same manner as Di-isononanyl-3EO-adipate by esterification of 1 mol 1,2-Cyclohexandiol+6EO with 2 mol Isononanoic acid at 160-220° C. until the calculated amount of water (2.26 mol) was removed by applying vacuum down to 50 mbar or even less. The final ester was bleached and filtrated by using Tonsil® filter aid (obtainable by Sid-Chemie AG, Germany) at 95° C. and a Seitz pressure filter with a K800 filter sheet (obtainable by Seitz-Schenk Fildersystems GmbH, Germany).

Cyclohexanedicarboxylic Acid-Isononanol-3EO-Diester 1 mol of cyclohexane dicarboxylic acid was esterified with 2 mol of Isononanol+3EO by using 0.5% methanesulfonic acid and 0.4% of hypophosphoric acid at 160-230° C. until the desired amount of 2 mol of water was distilled off by applying vacuum down to 50 mbar. The final product was treated with 1% of activated charcoal and PRIMISIL® 141 filter aid (obtainable by Süd-Chemie AG, Germany).

Example 2—Green House Trials

The influence of the adjuvants was tested separately in a curative and protective greenhouse trial on barley. In each case, barley was cultivated in a substrate "Frustorder Erde" for three weeks with three plants per pot. Each treatment was replicated 14 times. The adjuvant dose rate in each treatment was 50 ml/ha. The assessment of the infection rate was conducted by a trained biologist.

The adjuvants used in the trials are di-isononanyl-adipate cyclohexanedicarboxylic acid-isononanol-diester, 1,2-cyclohexanediol-di-isononate, di-isononanyl-3EO-adipate, cyclohexanedicarboxylic acid-isononanol-3EO-diester and 1,2-cyclohexanediol-6EO-di-isononate.

Curative Trial with Epoxiconazole:

An Epoxiconazole SC 250 was used. Inoculation of the leaves with powdery mildew (Blumeria graminis f. sp. hordei) was done 2 days prior to application of the Epoxiconazole formulation. From the stem, 15 leaf segments were cut off with a length of 10 cm using each the flag leaf (F) and the 2nd leaf (F-1). Altogether, the leaves of each were placed on benzimidazole agar i.e. 0.5% Agar with 40 ppm benzimidazole. The concentration of Epoxiconazole for the leaf application was 5 g/ha. Assessment was done 14 days after treatment (14 DAT) of the efficacy against powdery mildew by counting the mildew pustules per leaf on a length of 7 cm.

Protective Trial with Azoxystrobin:

4 h after application with the equivalent of 5 g/ha Azoxystrobin, leaf segments were cut off at a length of 7 cm from the stem. 15 leaves of each the F and the F-1 leaf were placed on agar. After the inoculation with powdery mildew (Blumeria graminis f. sp. hordei), the incubation time was 10 d. The assessment of the infection rate was conducted by a trained biologist.

Results

TABLE 1

Curative Trial

| Composition | Powdery mildew infestation (%) |
|---|---|
| Without Epoxiconazole and Adjuvant* | 79 |
| Epoxiconazole* | 33 |
| Epoxiconazole + Di-isononanyl-adipate* | 29 |
| Epoxiconazole + Di-isononanyl-3EO-adipate | 3 |
| Epoxiconazole + Cyclohexanedicarboxylic acid-isononanol-diester* | 21 |
| Epoxiconazole + Cyclohexanedicarboxylic acid-isononanol-3EO-diester | 16 |
| Epoxiconazole + 1,2-Cyclohexanediol-di-isononate* | 28 |
| Epoxiconazole + 1,2-Cyclohexanediol-6EO-di-isononate | 15 |

*Comparative Examples

This trial shows that mildew infestation can be significantly reduced by adding the alkoxylated esters of the present invention as compared to the active Epoxiconazole alone or more importantly as compared to the non alkoxylated esters.

TABLE 2

Protective Trial

| Composition | Powdery mildew infestation (%) |
|---|---|
| Without Azoxystrobin and Adjuvant* | 84 |
| Azoxystrobin* | 36 |
| Azoxystrobin + Di-isononanyl-adipate* | 27 |
| Azoxystrobin + Di-isononanyl-3EO-adipate | 3 |
| Azoxystrobin + Cyclohexanedicarboxylic acid-isononanol-diester* | 24 |
| Azoxystrobin + Cyclohexanedicarboxylic acid-isononanol-3EO-diester | 17 |
| Azoxystrobin + 1,2-Cyclohexanediol-di-isononate* | 29 |
| Azoxystrobin + 1,2-Cyclohexanediol-6EO-di-isononate | 16 |

*Comparative Examples

This trial shows that mildew infestation can be significantly reduced by adding the alkoxylated esters of the present invention as compared to the active Azoxystrobin alone or more importantly as compared to the non alkoxylated esters.

We claim:

1. An agrochemical composition comprising a pesticide and an alkoxylated ester adjuvant of a general formula (I)

$$R^1-O{+}R^2-O{\tfrac{}{n}}\overset{O}{\overset{\|}{C}}-X-\overset{O}{\overset{\|}{C}}{+}O-R^3{\tfrac{}{n}}O-R^4 \qquad (I)$$

or an alkoxylated ester adjuvant of a general formula (II)

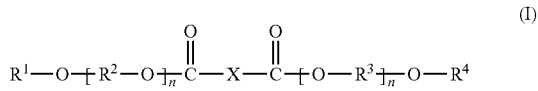

$$R^6-\overset{O}{\overset{\|}{C}}{+}O-R^2{\tfrac{}{n}}O-R^5-O{+}R^3-O{\tfrac{}{n}}\overset{O}{\overset{\|}{C}}-R^7 \qquad (II)$$

wherein the alkoxylated ester adjuvant of the general formula (I) or the alkoxylated ester adjuvant of the general formula (II) enhances the activity of the pesticide;

$R^1$, $R^4$, $R^6$ and $R^7$ each independently are a linear or branched alkyl having 5 to 18 carbon atoms, a linear or branched alkenyl having 5 to 18 carbon atoms, a heteroalkyl having 3 to 18 carbon atoms or a heteroalkenyl having 3 to 18 carbon atoms;

$R^2$ and $R^3$ each independently are selected from the group consisting of ethylene, propylene, butylene, and a mixture thereof;

X is a single bond, a saturated or unsaturated, linear or branched alkylene having 1 to 14 carbon atoms, a cycloalkylene having 4 to 14 carbon atoms, a saturated or unsaturated, linear or branched heteroalkylene having 1 to 14 carbon atoms or a heterocycloalkylene having 4 to 14 carbon atoms;

$R^5$ is selected from the group consisting of a saturated or unsaturated, linear or branched alkylene having 1 to 14 carbon atoms, a cycloalkylene having 4 to 14 carbon atoms, a saturated or unsaturated, linear or branched heteroalkylene having 1 to 14 carbon atoms, and a heterocycloalkylene having 4 to 14 carbon atoms; and n has a value of from 3 to 50.

2. The composition according to claim 1, wherein $R^1$, $R^4$, $R^6$ and $R^7$ each independently are selected from the group consisting of: a linear or branched alkyl, alkenyl, heteroalkyl and heteroalkenyl having 8 to 14 carbon atoms.

3. The composition according to claim 1, wherein $R^1$, $R^4$, $R^6$ and $R^7$ each independently are a linear alkyl having 8 to 12 carbon atoms or a hetereoalkyl having 8 to 12 carbon atoms.

4. The composition according to claim 1, wherein $R^2$ is ethylene or a mixture of ethylene and propylene.

5. The composition according to claim 1, wherein $R^2$ is ethylene.

6. The composition according to claim 1, wherein X is selected from the group consisting of a saturated, linear alkylene having 4 carbon atoms, a cycloalkylene having 6 carbon atoms, a heterocyclolalkylene having 4 carbon atoms and 1 oxygen atom, a heterocyclolalkylene having 4 carbon atoms and 2 nitrogen atoms, and furanyl.

7. The composition according to claim 1, wherein $R^5$ is selected from the group consisting of a saturated, linear alkylene having 4 carbon atoms, a cycloalkylene having 6 carbon atoms, a heterocyclolalkylene having 4 carbon atoms and 1 oxygen atom, a heterocyclolalkylene having 4 carbon atoms and 2 nitrogen atoms, and furanyl.

8. The composition according to claim 1, wherein the pesticide comprises at least one fungicide, at least one herbicide, or at least one insecticide.

9. The composition according to claim 8, wherein the fungicide is selected from the group consisting of carboxamides, triazoles and strobilurins.

10. A method of preparing the composition according to claim 1, the method comprising bringing the pesticide and the alkoxylated ester of general formula (I) or (II) into contact.

11. A method for (i) controlling phytopathogenic fungi, undesirable plants, or undesirable pest infestation, or (ii) regulating the growth of undesired plants or crop plants, the method comprising applying the composition as defined in claim 1 on at least one of (a) pests, (b) an environment of the pests, (c) crop plants to be protected from the pests, (d) soil associated with at least one of the pests and the crop plants to be protected from the pests, (e) undesired plants, (f) the crop plants, or (g) an environment of at least one of the undesired plants and the crop plants.

12. Seed comprising the composition according to claim 1.

* * * * *